United States Patent [19]

Hägele et al.

[11] Patent Number: 5,123,301

[45] Date of Patent: Jun. 23, 1992

[54] METHOD OF SHIFTING GEARS OF AUTOMATIC TRANSMISSION IN MOTOR VEHICLES

[75] Inventors: Karl-Heinz Hägele, Vaihingen/ENz; Peter Zieher, Eberdingen, both of Fed. Rep. of Germany

[73] Assignee: Robert Bosch GmbH, Stuttgart, Fed. Rep. of Germany

[21] Appl. No.: 585,122

[22] PCT Filed: Jul. 1, 1988

[86] PCT No.: PCT/EP88/00582

§ 371 Date: Sep. 27, 1990

§ 102(e) Date: Sep. 27, 1990

[87] PCT Pub. No.: WO90/00121

PCT Pub. Date: Jan. 11, 1990

[51] Int. Cl.[5] .............................................. F16H 59/24
[52] U.S. Cl. ........................................ 74/866; 74/877; 364/426.04
[58] Field of Search ............................. 74/866, 877; 364/426.04

[56] References Cited

U.S. PATENT DOCUMENTS

| 4,523,281 | 6/1985 | Noda et al. ................. 74/866 X |
| 4,669,335 | 6/1987 | Matsuoka et al. ................. 74/866 |
| 4,796,489 | 1/1989 | Nagamatsu et al. ................. 74/868 |
| 4,807,497 | 2/1989 | Yasue et al. ................. 74/866 X |
| 4,823,642 | 4/1989 | Iwaki et al. ................. 74/863 X |
| 4,825,372 | 4/1989 | Yasue et al. ................. 74/866 X |
| 4,843,916 | 7/1989 | Bouta ................. 74/866 |
| 4,889,015 | 12/1989 | Kondo ................. 74/866 |
| 4,933,859 | 6/1990 | Tsuyama et al. ................. 74/866 X |
| 4,939,657 | 7/1990 | Imai et al. ................. 364/426.04 |
| 4,984,485 | 6/1991 | Kojima et al. ................. 74/866 |
| 4,996,893 | 3/1991 | Nakamura et al. ................. 74/877 X |
| 5,005,442 | 4/1991 | Sakakibara et al. ................. 74/867 X |
| 5,020,391 | 6/1991 | Aoki et al. ................. 74/866 |
| 5,022,285 | 6/1991 | Suzuki ................. 74/867 X |

FOREIGN PATENT DOCUMENTS

| 3139838 | 4/1983 | Fed. Rep. of Germany . |
| 2602724 | 2/1988 | France . |
| 57-184754 | 2/1983 | Japan . |
| 58-211061 | 3/1984 | Japan . |
| 2101243 | 1/1983 | United Kingdom . |

Primary Examiner—Dirk Wright
Attorney, Agent, or Firm—Michael J. Striker

[57] ABSTRACT

Method of shifting the gears of a vehicle automatic transmission between at least first and second different control modes including the step of effecting a changeover from the first to the second control modes when the speed with which the accelerator travels downward exceeds a predetermined limit or when the accelerator travels past a predetermined position. The method also includes effecting changeover from the second control mode to the first control mode when the accelerator travels back a predetermined amount, for example when released, but only if the accelerator pedal does not subsequently travel forward at more than a predetermined rate during a predetermined time of acceleration after the accelerator pedal had moved back. However, changeover from the second control mode to the first control mode can be effected in response to movement of the accelerator pedal below a predetermined position reduced by a fixed amount to account for hysteresis. The first control mode can be such that fuel consumption is optimized, while the second control mode can be such as to provide a maximum acceleration.

9 Claims, 4 Drawing Sheets

METHOD OF SHIFTING GEARS OF AUTOMATIC TRANSMISSION IN MOTOR VEHICLES

BACKGROUND OF THE INVENTION

The present invention relates to a method of shifting gears in a vehicle automatic transmission in which the gears are shifted according to at least first and second different control modes.

A method for shifting gears in a vehicle having automatic transmission has been proposed, in which the gears may be changed either according to a "SPORT" mode or a so-called "ECONOMY" mode. In the SPORT mode the gears are shifted so as to give good acceleration. In the ECONOMY mode, the gears are shifted so as to give more economical fuel consumption. The vehicle is provided with a manually operable switch for changing over from one mode to the other, and located on the dashboard, for example. The driver can select a particular driving mode according to his or her requirements.

While this system has been successful to some extent, it is inconvenient in that the driver must operate the switch in order to change from one mode to the other. In a vehicle having automatic transmission it is desirable for the minimum action on the part of the driver to be required.

SUMMARY OF THE INVENTION

The object of the invention is a method for changing gears which enables a change-over from one mode to the other in response to movements of the accelerator pedal.

The known ECONOMY mode for effecting gear changes, although intended to give good fuel consumption, is not entirely "consumption optimized". The reason for this is that if the gears are changed solely so as to give the minimum fuel consumption, the vehicle can seem very sluggish to drive from the driver's viewpoint. The known ECONOMY mode is therefore a compromise between optimum fuel economy and reasonable "drivability". For example, it is designed to enable the driver to achieve reasonable acceleration without the need to change to SPORT mode. In fact some production vehicles are not provided with the facility to change to SPORT mode. Since, in the present invention changes from one mode to the other are effected automatically by "foot movement" it is possible for one of the control modes to be a true "fuel-optimized" mode and the other to be the standard SPORT mode. The "fuel-optimized" mode can be used under steady state driving conditions (and is hereinafter referred to as the "steady-state driving mode") and can be even more economical than the known ECONOMY mode in terms of gasoline consumption because when the driver wants to accelerate, he can do so by switching to SPORT mode through suitable action on the accelerator pedal. Thus, the drivability and automotive dynamics are not impaired.

Thus, in the preferred embodiment of the invention the first control mode provides for shifting the gears primarily to achieve minimal fuel consumption. The gears are shifted mainly on the basis of consumption optimized shift curve characteristics which are derived for the particular engine. Departures from these characteristics in order to improve drivability may be necessary under certain driving conditions. The second control mode is preferably provided for shifting the gears primarily to achieve maximum acceleration, e.g. the standard SPORT mode.

The changeover from one control mode to another may be effected in dependance on the speed of movement of the accelerator pedal. For example a changeover may be effected when the speed of pedal movement in the positive direction exceeds a predetermined limit, i.e. the driver presses the accelerator pedal down at more than a predetermined speed.

Alternatively the changeover may be effected when the accelerator pedal is moved beyond a predetermined position, e.g. the driver presses the accelerator pedal down past a certain point.

The method also includes effecting changeover from the second control mode to the first control mode when the accelerator travels back a predetermined amount, for example when released, but only if the accelerator pedal does not subsequently travel forward at more than a predetermined rate during a predetermined time of acceleration after the accelerator pedal had moved back. However, changeover from the second control mode to the first control mode can be effected in response to movement of the accelerator pedal below a predetermined position reduced by a fixed amount to account for hysteresis.

The present invention both as to its construction so to its mode of operation, together with additional objects and advantages thereof, will be best understood from the following detailed description of the preferred embodiments when read with reference to the accompanying drawings.

DETAILED DESCRIPTION OF THE PREFERRED EMBODIMENTS

Figure 1:
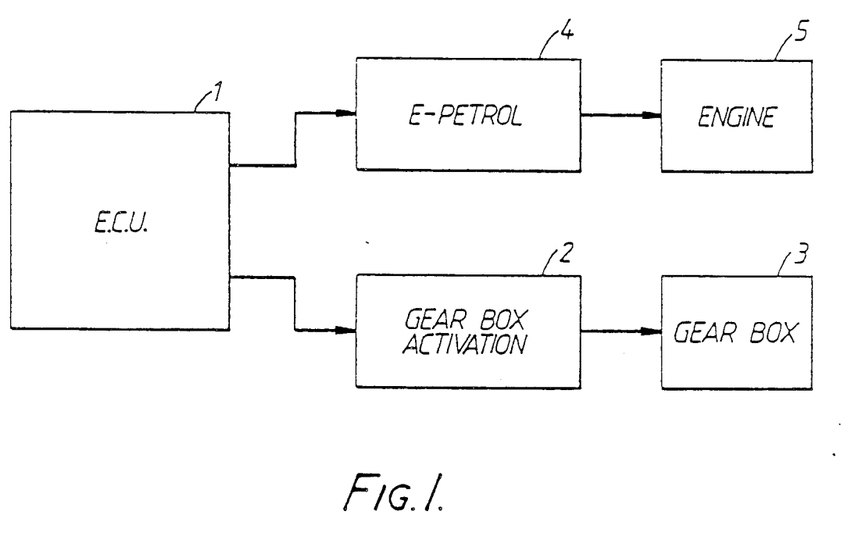
FIG. 1 is a schematic block diagram showing the functions of the control system.

The components for implementing the present invention may comprise a standard electronic control unit (ECU) 1 such as the Siemens SMP module system. The ECU may be connected to a standard self-sufficient gear box control unit 2 for controlling the gear box 3. The method of the invention is particularly suitable for use in a vehicle having an EH gear box 3 and an E-gasoline system 4 as indicated in FIG. 1. In an EH gear box, gear shifts are effected hydraulically in response to electrical signals from the gear box control unit 2. The E-gasoline system replaces the mechanical coupling of the accelerator to the throttle valve. Thus, with an E-gasoline system, electrical signals derived from movements of the accelerator govern the opening of the throttle valve which in turn affects the engine 5.

The ECU 1 contains the simulation of the gear box control system. In this embodiment of the invention, the ECU contains the simulation of the standard "SPORT" gear box control system and also a "steady state driving" gear box control system which will be explained in more detail below. Thus, the vehicle can be driven according to a SPORT mode or a steady state driving mode depending on which system simulation is in operation. The ECU provides the shift commands for the gears and the torque conversion clutch to the gear box control unit which in turn processes the commands and triggers corresponding solenoid valves in the EH gear box. In addition, the self sufficient gear box control unit takes on safety functions and time sequence control.

The standard SPORT gear box control system and its electronic simulation are known in the art and are intended to provide good automotive dynamics including maximum acceleration. The detailed operation of the SPORT mode does not form part of this invention and will not be described further herein. The steady state driving gear box control system operates to ensure that fuel consumption is kept to a minimum as long as possible, i.e. when the vehicle is being driven in the steady state driving mode, the ECU signals the gear box control system 2 to cause the gears to be shifted so as to keep fuel consumption to a minimum.

Thus, as well as data for the simulation of the SPORT gear box control system, the ECU contains data for the simulation of the steady state driving control system. The simulation of the SPORT gear box control system will hereinafter be referred to as the "SPORT mode" and the simulation of the steady state driving control system will hereinafter be referred to as the "steady state driving mode".

For the steady state driving mode the ECU stores reference maps giving the most favorable gear for consumption for every gear shift operation and every operating point (in terms of throttle valve position and engine speed) of the engine. The data for these can be calculated using the specific constant consumption characteristics Be = f(Nmot,We) and the throttle valve characteristics Dk = f(Nmot,We) for the particular engine, where:

Be = specific consumption of the engine
DK = throttle flap position
Nmot = engine speed
We = specific power of the engine.

These characteristics are derived from tests performed on the engine and may be supplied by the manufacturer. They may be used to plot the throttle valve characteristics against output speed and the most favorable gear for consumption can then be entered for every shift operation and every possible operating point. The most favorable gears are calculated on the basis of a consumption advantage, that is the gears are calculated so that the consumption advantage exceeds a minimum value on shifting gear. By defining a consumption advantage, it is ensured that the gears are not shifted so frequently as to make the vehicle unpleasant to drive. In the particular vehicle on which the invention was tested a suitable consumption advantage was found to be 2%. In the case of engine powers which cannot be provided in the next higher gear, the gear is only changed at speeds below the maximum engine speed. A further boundary condition for gear shifting is that the new engine speed must be within certain limits. In the test vehicle the boundary condition was set such that new engine speed must be >1000 r.p.m. and <5,500 r.p.m.

The reference maps can be reduced to simpler shift curve characteristics since there is only one boundary line between the starting gear and the new gear. (This does not in principle have to be the case for different types of engine.)

Thus, overall six maps are generated, one for each switching process, namely $\frac{1}{2}$, $\frac{2}{3}$, $\frac{3}{4}$ and 4/3.

In the test vehicle control of the gear changes according to consumption-optimized shift curve characteristics derived in the manner described above was found to produce generally favorable gear shift behavior. However, in the high road speed range the 4/3 switching characteristic causes an earlier switching characteristic in the ECONOMY program. This is partly due to enrichment of the engine in the direction of full load causing poorer specific fuel consumption at high loads. Sometimes switching down from fourth gear to third can be more economical at high speed. Another reason for the increased number of gear changes 3/4 and 4/3 is connected with the changing of control mode in response to accelerator pedal movements which will be explained below. Since the accelerator pedal movements of the driver are greater in the higher speed range (the acceleration of the vehicle as a response to accelerator pedal changes is less) 4/3 switching operations occur more frequently as a result of a change to SPORT mode as do $\frac{3}{4}$ switching operations as a result of a change back to ECONOMY mode when the pedal is released.

Although downward shifting from fourth gear to third might be desirable from the point of view of fuel consumption it is undesirable at high road speeds. Each gear change is associated with a jolt and too-frequent gear changes are unpleasant for the driver. In the preferred embodiment of the invention it is assumed that this downward shifting is unacceptable in the high road speed range for comfort reasons and instead of the shift criterion "consumption-optimum", a compromise has to be reached between driving comfort and consumption.

For this reason, and in order to be able to better assess the drivers requirements (see below) the consumption optimized shift characteristic curves for the steady state driving mode are approximated to the shift characteristic curves for the known ECONOMY gear box control system for gear changes from third to fourth gear and from fourth to third.

As a result, changeovers from steady state driving mode to SPORT mode in response to movements of the accelerator pedal do not occur in fourth gear. A manual "override" switch might be desirable in order to change from steady state driving mode to SPORT mode when in fourth gear if change is required by the driver.

According to the present invention, changes from one control mode to another are effected in response to movements of the accelerator pedal. The accelerator pedal behavior of the driver can be assessed to determine the driver's requirement for acceleration, constant travel or deceleration. In the embodiments of the invention to be described below only the detection of the driver's requirement for acceleration is needed. Thus, referring to FIG. 1. the ECU receives electrical signals indicating the accelerator pedal position and uses these signals to determine which driving mode is required.

If it is detected that the driver requires acceleration the gears are shifted according to the standard SPORT mode and if not, i.e. if the "steady state driving mode" is required by the driver the gears are shifted according to the "consumption-optimized" shift characteristic curves described above. The SPORT mode is only used to change gears 1 to 3 since it is these gears which give maximum acceleration. The consumption-optimized rode controls shift operations between all of the gears 1 to 4.

It should be noted here that the "steady-state driving mode" is a driving mode with primarily a constant driving speed on average but permits small accelerations for distance correction in traffic.

Figure 2:
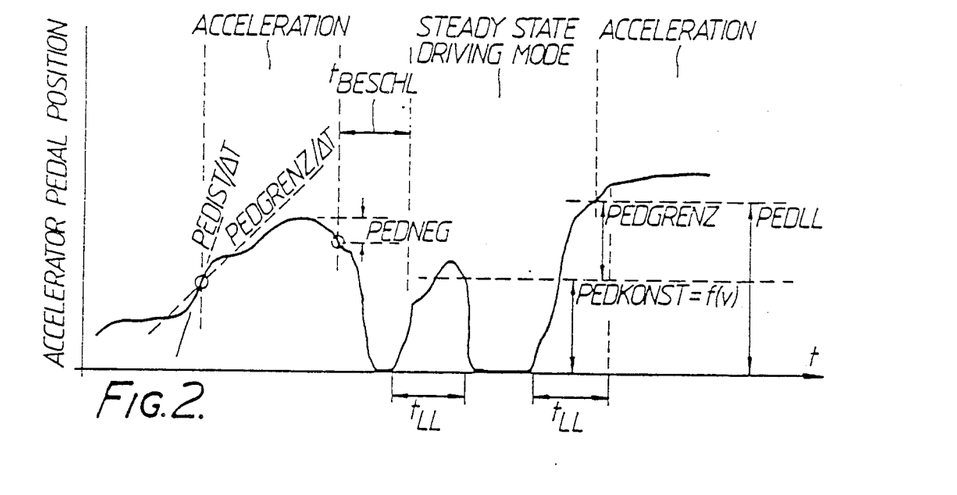
FIG. 2 is a graph illustrating gear shifts according to the rate of change of an accelerator pedal position.

In one embodiment of this invention, illustrated in FIG. 2 the driver's requirement for acceleration is assessed from the speed of travel of the accelerator pedal as the vehicle is being driven. It is assumed that if acceleration is required by the driver the speed of travel of the pedal will be greater than if the steady-state driving mode is required. If a specified rate of travel of the pedal is exceeded, the steady-state driving mode is terminated immediately and the gears are then shifted according to the shift characteristic curves for the SPORT mode. FIG. 2 is a graph of accelerator pedal position versus time during a typical drive. At the point A indicated on the graph the rate of travel of the pedal exceeds the limit of the pedal position versus time, and the steady state driving mode is terminated.

If, while the vehicle is being driven in the steady-state driving mode, the accelerator pedal is released completely and the engine is operating under no-load conditions, then for a period immediately following the no-load condition the driver's requirement for acceleration is not determined from the rate of travel of the accelerator pedal. Instead, the pedal position value is compared for a time $t_{LL}$, indicated in FIG. 2, with a value PEDLL which is made up of a basic value pedal constant position, and a movement value pedal limit position. If the accelerator pedal position exceeds the PEDLL value, the steady-state driving mode is terminated and the system changes to SPORT mode. The value pedal constant depends on the speed of the vehicle and is the pedal position for a constant driving speed previously adopted by the driver. Thus, for example, suppose the driver is driving the vehicle at a constant driving speed and the road slopes downwards so that the driver is able to take his foot off the accelerator and still maintain a constant road speed. If the driver quickly returns the pedal to the position previously adopted it is assumed that he wishes to continue in the steady-state driving mode, but if the new pedal position exceeds that previous pedal position by the amount pedal limit position or more in the time tLL, it is assumed that acceleration is required. Once the time tLL has expired the rate of travel of the accelerator pedal is again used to determine the driver's requirement for acceleration. Thus, at the point B shown in FIG. 2 the SPORT mode begins again, but the control system does not change to SPORT mode during the first period tLL indicated on FIG. 2.

The speed is also measured and the SPORT mode is always adopted for speeds less than e.g. 13km/h to ensure good acceleration from rest.

It will be appreciated that the speed at which the driver moves the accelerator pedal will depend on the actual road conditions encountered. By switching from one mode to another solely in accordance with the speed of movement of the pedal, slow accelerator pedal changes up to nearly full load do not give rise to a change from the steady state driving mode to the SPORT mode. This is appropriate when the acceleration of the vehicle remains low as the pedal is moved (i.e. when travelling up-hill) because the driver is simply maintaining a steady speed. On the level, however, slow accelerator pedal changes mean a corresponding (deliberate) acceleration. Thus, in the preferred embodiment of the invention the acceleration of the vehicle is measured as well as the rate of travel of the pedal, in order to better assess the driver's requirements. In the event of deliberate acceleration the system changes to SPORT mode and switching up via high engine speeds is avoided.

For FULL POWER ON and KICKDOWN ON, the steady-state driving mode is always terminated without any time delay. In this embodiment of the invention the system changes back to the steady-state driving mode from the SPORT mode in response to a negative accelerator pedal change. As shown in FIG. 2 the steady-state driving mode is only restarted if a negative pedal change of a predetermined amount pedal negative has occurred and a delay time acceleration has occurred after that change during which the pedal is not depressed again. Thus, at point C in the graph of FIG. 2 the control system switched from SPORT mode to steady-state driving mode.

Figure 3:
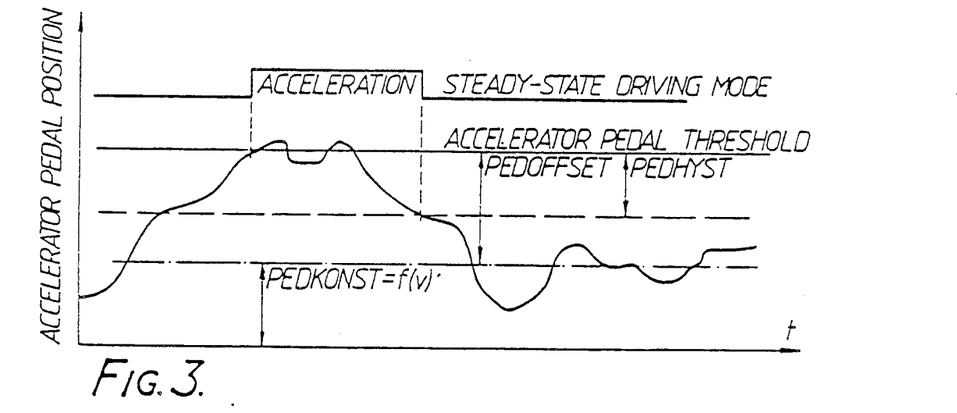
FIG. 3 is a graph illustrating gear shifts according to an accelerator pedal threshold position.

In a second embodiment of this invention, illustrated in FIG. 3, the driver's requirement for acceleration is determined from the depth to which the accelerator pedal is depressed. Thus, if the pedal is depressed beyond a certain threshold, the "steady-state mode is terminated and the system changes over to SPORT mode. The threshold is made up of a speed dependant accelerator pedal value pedal constant for a constant driving speed and a pedal offset value pedal offset for driver control to introduce the SPORT mode. Thus, if the driver is driving the car at a constant speed with the pedal at the pedal constant level (or within certain limits of that level), and then depresses the pedal by an additional amount pedal offset, the steady-state driving mode is terminated. The value pedal offset may be fixed or it may be speed-dependant since the driver's pedal movement behavior may depend on the vehicle speed. Referring to FIG. 3, the steady state driving mode is terminated at point A. As with the previously described embodiment of the invention, the steady-state driving mode is also terminated immediately in the event of a full power or kickdown signal. The steady-state driving mode is only returned to if the actual accelerator pedal value subsequently becomes less than the threshold value (reduced by a hysteresis value PEDHYST to prevent excessive fluctuations between modes), i.e. the driver backs off the accelerator pedal. The steady state driving mode restarts at B in FIG. 3. (PEDHYST may be fixed or it may be speed-dependant).

The mode-changing strategy of this embodiment of the invention may be modified so that at speeds above 130 km/h the accelerator pedal threshold value is set so high than an acceleration requirement is only signalled when full power is reached. In 4th gear, it is arranged that full power is reached at a pedal value of 70% by correspondingly increasing the accelerator pedal/throttle valve characteristic curve. This is done in order to modify the steady-state driving mode to reduce the subjective sensation of sluggishness in th gear. A steeper accelerator pedal/throttle valve characteristic is introduced for the 4th gear as compared with gears 1 to 3.

The fourth gear characteristic curve is represented by the following equation:

$$\frac{Dk}{Dk\text{MAX}} = \frac{\text{PEDACTUAL}\ 1}{\text{PEDMAX}} + \frac{\text{PEDACTUAL}}{K * \text{PEDMAX}}$$

The pedal value at which the throttle valve reaches maximum power is specified via the constant K. In this case it was chosen to be 70%. The result is that at the 70% pedal value the throttle valve is set at full power and the sharp change in output for a ¾ shift or a 4/3 shift is reduced.

The output before and after a gear shift operation should be the same for good drivability. The engine torques should therefore be adjusted via the throttle valve in the inverse ratio of the engine speeds before and after a shift operation, taking the throttle valve characteristic curves We =f(Dk, Nmot) into consideration.

The different accelerator pedal throttle valve characteristic curves for 3rd and 4th gear mentioned above only make a limited contribution to the output matching in the shift operations 3/4 and 4/3. The precise matching of the output on changing gear using the throttle valve results in operating points which are not necessarily situated on the accelerator pedal/throttle valve characteristic curves for 3rd and 4th gear. In order to avoid any "drifting apart" of the throttle valve and accelerator pedal after several shift operations the seconds between the actual accelerator pedal point and idling or full power (referred to the accelerator pedal) are calculated as new accelerator pedal/throttle valve characteristic curves after every output matching and accelerator pedal movement. As a result, the original characteristic curve is approached again as a result of every accelerator pedal movement.

Figure 4:
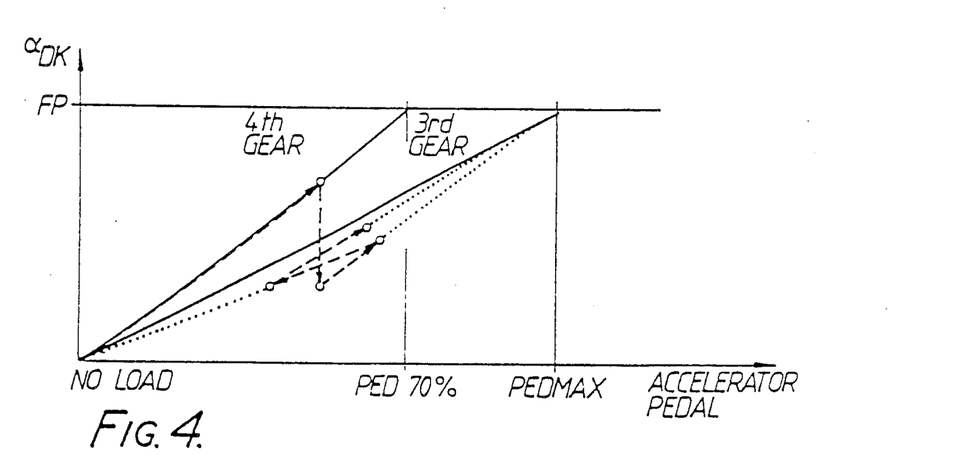
FIG. 4 is a graph illustrating the output matching of gear changes.

This is illustrated in FIG. 4 which shows a shifting down operation from 4th to 3rd gear. The output matching results in operating points away from the characteristic waves, shown in bold lines. Movements of the accelerator pedal result in iterative approximation to the original characteristic curve.

Systems according to the invention have been tested on a vehicle having automatic transmission provided with an EH gear box and an E-gasoline system as described above. Various measurements were made on the test vehicle in order to evaluate the systems. The results will now be described to show the advantages of the invention.

Consumption measurements for the CVC (city vehicle cycle) test and the highway test were carried out on a roller-type test stand. The CVS test is intended to simulate the conditions of normal throughtown driving and the highway test is intended to simulate driving on normal country roads. For the CVS test 3 measurements with different sequences were carried out for each different gear box control program in the high temperature (ht) phase. For the highway test only 2 measurements were carried out in each case. At the same time as measuring the consumption on the basis of the exhaust gas on the test stand, the consumption was also measured on the basis of injection time determined from the gear box control system. The constant driving speed consumption values for speeds up to 140 km/h were also determined, by actually taking the vehicle on to a motorway.

The following gear box control programs were measured:
a) standard "SPORT" gear box control program;
b) standard "ECONOMY" gear box control program;
c) shifting using the accelerator pedal speed between the "SPORT" shift characteristic curves and the consumption-optimized shift characteristic curves
d) shifting using the accelerator pedal threshold between the "SPORT" shift characteristic curves and the consumption-optimized shift characteristic curves
e) driving with consumption-optimized shift characteristic curves.

The results of the tests are shown in the following tables:

| Consumption measurements for CVC test (ht phase in 1/100 km)) | | | | | |
|---|---|---|---|---|---|
| MEASUREMENT | SPORT | ECONOMY | ACCELERATOR PEDAL SPEED | ACCELERATOR PEDAL THRESHOLD | OPTIMIZATION CHARACTERISTIC CURVE |
| Exhaust gas | 11.58 | 10.75 | 10.22 | 10.27 | 10.37 |
| Ti | 11.37 | 10.62 | 10.16 | 10.29 | 10.39 |
| Exhaust gas | 11.33 | 10.33 | 10.23 | 10.43 | 10.28 |
| Ti | 11.47 | 10.48 | 10.35 | 10.35 | 10.40 |
| Exhaust gas | 11.41 | 10.33 | 10.11 | 10.12 | 10.13 |
| Ti | 11.47 | 10.54 | 10.19 | 10.26 | 10.36 |
| Mean value: | | | | | |
| Exhaust gas | 11.44 | 10.47 | 10.19 | 10.27 | 10.26 |
| Ti | 11.44 | 10.54 | 10.23 | 10.30 | 10.38 |

| Consumption measurements in highway test (in 1/100 km) | | | |
|---|---|---|---|
| MEASUREMENT | SPORT | ECONOMY | ACCELERATOR PEDAL THRESHOLD |
| Exhaust gas | 9.64 | 7.56 | 7.51 |
| Ti | 9.47 | 7.52 | 7.42 |
| Exhaust gas | 9.68 | 7.46 | 7.50 |
| Ti | 9.50 | 7.55 | 7.45 |
| Mean value: | | | |
| Exhaust gas | 9.66 | 7.51 | 7.51 |
| Ti | 9.49 | 7.54 | 7.44 |

| Consumption measurement on autobahn (average speed 130 km/h) | |
|---|---|
| SPORT: | 14.4 to 15.5 1/100 km |
| ECONOMY: | 11.4 to 12.9 1/100 km |

| -continued | |
|---|---|
| ACCELERATOR PEDAL THRESHOLD: | 10.7 to 12.7 1/100 km |

Figure 5:
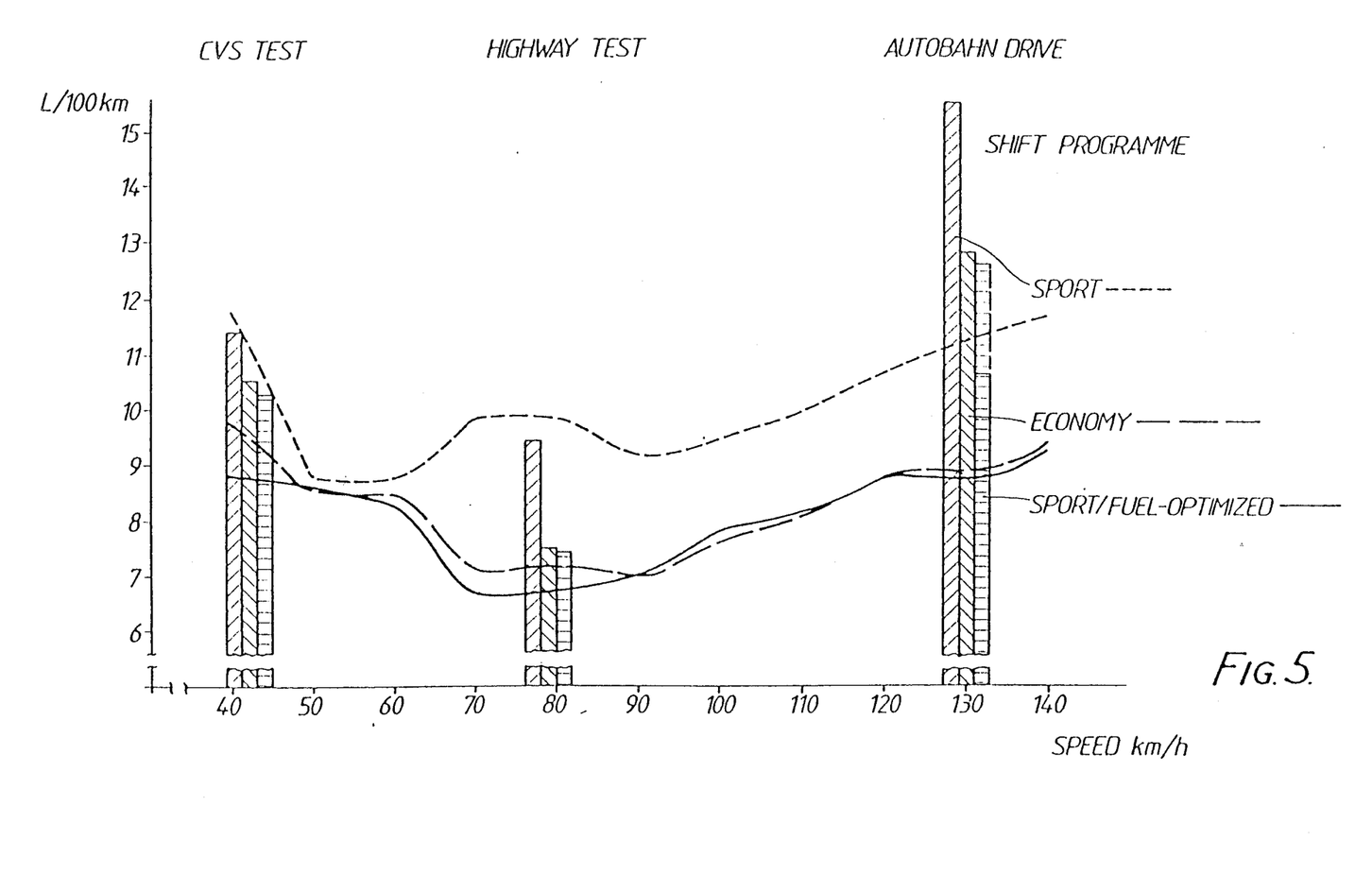
FIG. 5 is a graph comparing fuel consumption in a system according and in the invention to standard ECONOMY and SPORT control systems.

FIG. 5 summarizes the results of the above tables graphically. The solid line indicates measurements of fuel consumption taken with a SPORT/ fuel optimized system according to this invention, with changes between modes according to the "accelerator pedal position threshold" changeover strategy. The long dashed line shows measurements taken with the standard known ECONOMY program and the short dashed line shows measurements taken with the standard known SPORT program. The block diagram superimposed on FIG. 5 shows the average fuel consumption measurements for the CVS test, the highway test and the motorway test.

It is clear from the above tables and the graph of FIG. 5 that the sport/fuel optimized control system results in fuel consumption values comparable to those of the standard ECONOMY program while enabling the gears to be changed according to the standard "SPORT" mode when acceleration is required.

The results of the drivability tests show that the system according to the invention does not result in a deterioration of the automotive dynamics.

In order to be able to evaluate the drivability of the vehicle when controlled by a system according to the invention, and to measure a test driver's assessment, a key switch was installed on the selector level for the automatic gear box. The key switch was operable to provide a mark each time a gear change occurred which was unnecessary in the driver's opinion and a mark each time the driver felt that an additional gear change was necessary. Thus, the test drivers were asked to operate the switch each time an "unnecessary" gear change occurred and also to operate the switch each time they felt that an additional gear change should have occurred.

The test drives were carried out with 6 drivers on the motorway with the same run and at speeds above 100 km/h. In this speed range, an average acceleration results in a shift down from gear 4 to gear 3.

The test drives were carried out and evaluated with different gear box control programs including the standard ECONOMY program for comparison. In the evaluation of the results a distinction was drawn between correct shift operations, additionally required shift operations and superfluous shift operations. The sum of the superfluous and correct shift operations is the total number of shift operations which occur in a test drive.

Figure 6:
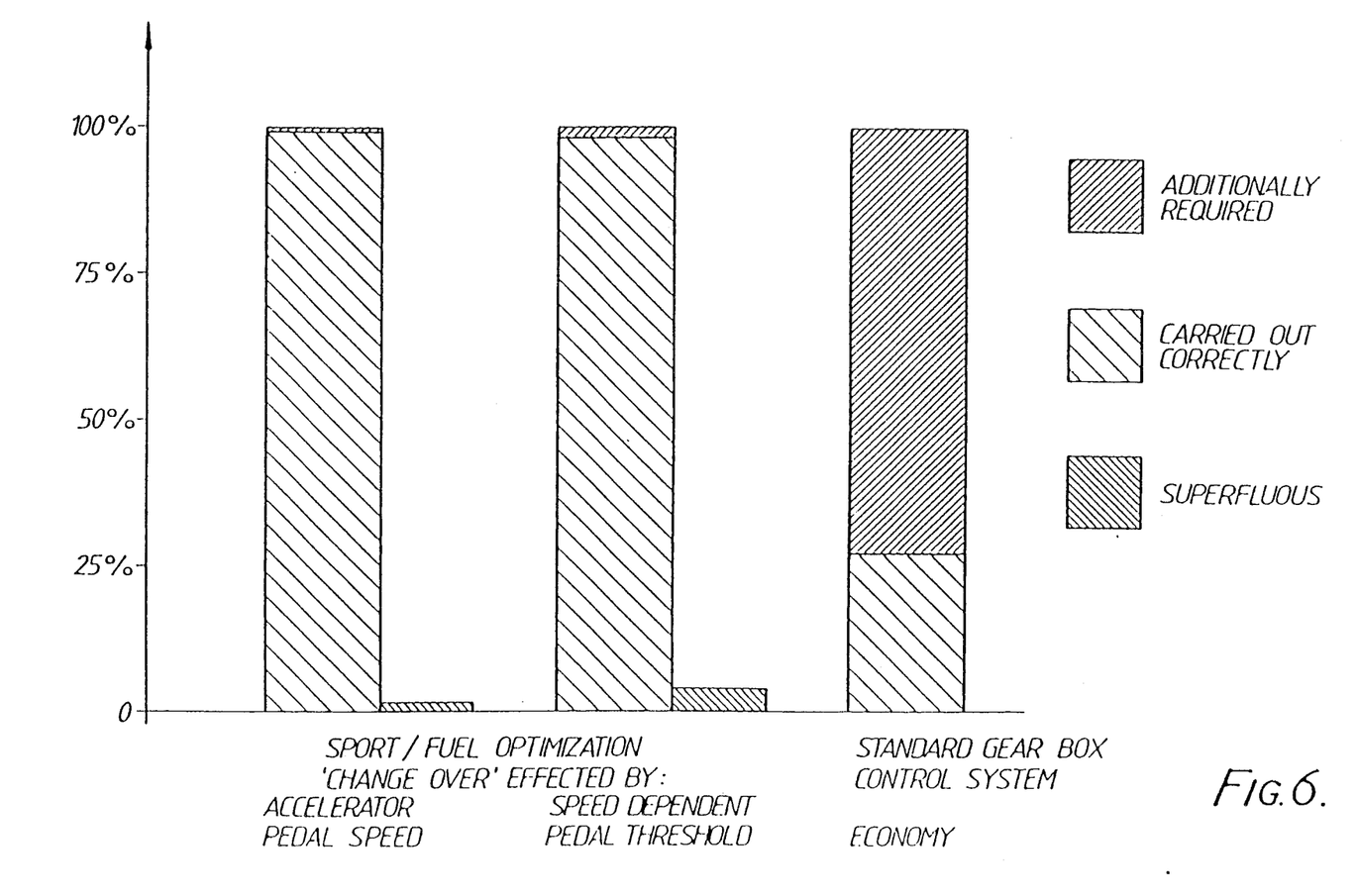
FIG. 6 is a block diagram showing the results of drivability tests comparing control systems according to this invention with a standard ECONOMY control system.

The results of the drivability tests are shown in the bar chart of FIG. 6. In this bar chart the sum of the correct and additionally required shift operations is standardized.

It can be seen that the "drivability" of the systems with mode changes according to an accelerator pedal threshold and the accelerator pedal speed is similar but both systems are a great improvement over the standard ECONOMY program.

On evaluating the positions of the entered marks in relation to the rates of change of pedal position it was found that with shifting from one mode to another according to the accelerator pedal speed, for the best possible driver acceptance, the limit value for the accelerator pedal speed should be matched for different drivers. In the test vehicle, knobs were provided which could be turned to vary the limit value PEDGRENZ and the hysteresis value PEDHYST respectively. In practice, for optimum design, all three values PEDHYST, PEDGRENZ and PEDOFFSET should be adapted to the particular driver. Thus, some means for adjusting these parameters may be desirable in a practical system. Such means may comprise manually adjustable knobs or the control system may determine and set suitable values itself from the accelerator pedal movements.

It was found that shifting from one mode to another using the accelerator pedal threshold did not present problems for different drivers for constant adjustment values since the size of the regulating movements carried out by different drivers differed less than the rate of accelerator pedal increases.

Shifting using an accelerator threshold and the full power requirement referred to above has the advantage that for speeds above 130 km/h, the size of the regulating movement or the torque reserve for the steady state driving mode is greater and results in fewer shift operations, but on the other hand response to an acceleration requirement requires a pedal movement of up to 70% of the accelerator pedal travel.

There now follow two examples of shift strategy summaries to further illustrate the inventions.

SUMMARY OF SHIFT STRATEGIES (OPTIMON = "steady-state driving mode")

EXAMPLE 1

SHIFT USING ACCELERATOR PEDAL SPEED

1) Initial state: OPTIMOFF, preceded by negative pedal change

```
                       Shift using accelerator pedal speed
(1)      Initial state: OPTIM.OFF, preceded by negative pedal change
OPTIM.ON:              (dNAB(t)/dt       <       NABGRENZ)  ... a
              AND      (dPED(t)/dt       <       PEDGRENZ)  ... b
              AND      ((FP AND KD)      =       OFF       )  ... c
              AND      ( SPEED           >       13 km/h   )  ... d
              AND      (tBESCHL          >       13 sec    )
Waiting time tBESCHL occurs if a,b,c, and d are fulfilled
(2)      Initial state: OPTIM.ON
OPTIM.OFF: a OR b OR c OR d not fulfilled
(3)      Initial state: OPTIM.ON, after no load
OPTIM.ON:              ( tLL             <       0.75 sec )
              AND      ( PED(t)          <       PEDCONST + PEDLIMIT)
Waiting time tLL initiated after terminating no load; for tLL > 0.75 sec.
1 applies)
(4)      Initial state: change OPTIM.ON/OPTIM.OFF
```

-continued

| Shift using accelerator pedal speed | | |
|---|---|---|
| OPTIM.OFF: | PED(t) > | PEDMAX(OPTIM.OFF)-PEDNEG |
| Constants: | NABLIMIT | 250 r.p.m./sec |
| | PEDLIMIT | 100 (10% of PEDmax for 3)) |
| | | (66% of FP/sec for 1)) |
| | PEDNEG | 40 ( 4% of PEDmax ) |
| | tACL | 3 sec |
| | tLL | 0.75 sec |
| | PEDCONST = | f(speed, 4th gear) |
| | Sampling time 50 ms | |

EXAMPLE 2

| Shift using accelerator pedal threshold | | | |
|---|---|---|---|
| (1) Initial state: OPTIM.OFF | | | |
| OPTIM.ON: | | (PED(t) < PEDCONST + PEDOFFSETT + PEDHYST | ) |
| | AND | ( FP AND KD) = OFF | ) |
| | AND | ( v > 13 km/h | ) |
| (2) Initial state: OPTIM.ON | | | |
| OPTIM.OFF | | ( PED(t) > PEDCONST + PEDOFFSET | ) |
| | OR | ( FP OR KD) = ON | ) |
| | OR | ( V < 13 km/h | ) |
| Constants: | | PEDOFFSET 200 (20% of PEDmax) | |
| | | PEDHYST 70 ( 7% of PEDmax) | |
| | | PEDCONST = f(v, 4th gear) | |

(note: FP = full power KD - kickdown)

Other strategies for changing from one mode to another are possible in accordance with this invention, for example, a speed-dependent limit for the rate of travel of the accelerator pedal could be applied. In the pedal-threshold strategy, a driving-speed-dependent pedal offset value could be introduced.

While the invention has been illustrated and described as embodied in a method of shifting gears of automatic transmission in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Method of shifting a vehicle automatic transmission having a plurality of gears, the gears of the vehicle automatic transmission being shiftable between at least first and second different control modes, in a vehicle having an accelerator pedal, said method including the steps of effecting changeover from the first to the second control modes in response to a movement of the accelerator pedal and effecting changeover from the second control mode to the first control mode in response to another movement of the accelerator pedal a predetermined amount in a negative-direction but only if the accelerator pedal is not subsequently moved in a positive direction at more than a predetermined rate during a predetermined time of acceleration after the accelerator pedal had been moved in the negative direction, wherein moving said accelerator in the positive direction corresponds to pressing said accelerator pedal down to require an acceleration of the vehicle and moving said accelerator in the negative direction corresponds to said accelerator pedal travelling back.

2. A method as set forth in claim 1, wherein said step of effecting changeover from said first control mode to said second control mode depends on a speed of movement of the accelerator pedal.

3. A method as set forth in claim 2, wherein said step of effecting changeover from the first control mode to the second control mode occurs when the speed of movement of the accelerator pedal in the positive direction exceeds a predetermined limit.

4. A method as set forth in claim 1 wherein said step of effecting changeover from the first control mode to the second control mode occurs in response to moving the accelerator pedal beyond a predetermined position in the positive direction.

5. A method as set forth in claim 4, including the step of determining the predetermined position in accordance with a vehicle speed immediately prior to movement of the vehicle acceleration pedal beyond the predetermined position.

6. A method as set forth in claim 5, wherein said determining step comprises determining the predetermined position as a sum of a value dependent on the vehicle speed immediately prior to movement of the vehicle acceleration pedal beyond the predetermined position, and a fixed value.

7. A method as set forth in claim 1, wherein the first control mode provides for shifting gears so as to optimize fuel consumption.

8. A method as set forth in claim 1, wherein the second control mode provides for shifting gears to maximize acceleration.

9. Method of shifting a vehicle automatic transmission having a plurality of gears, the gears of the vehicle automatic transmission being shiftable between at least first and second different control modes, in a vehicle having an accelerator pedal, said method including the steps of effecting changeover from the first to the second control modes in response to a movement of the accelerator pedal and effecting changeover from the second control mode to the first control mode in response to another movement of the accelerator pedal back below a predetermined position reduced by a fixed amount.

* * * * *